United States Patent Office 3,424,772
Patented Jan. 28, 1969

3,424,772
HALOALKOXY-HALODIKETO-, HALODIKETO-
AND FLUOROALKOXY-METAL COMPOUNDS
Ross W. Moshier, Kettering, Ohio, assignor to the United
States of America as represented by the Secretary of
the Air Force
No Drawing. Filed Aug. 23, 1965, Ser. No. 481,986
U.S. Cl. 260—429                        14 Claims
Int. Cl. B01d 53/00; C07f 7/28, 9/00

ABSTRACT OF THE DISCLOSURE

A haloalkoxydiketo metal compound of the general formula $$(R^vCH_2O)_yMX_{n-(y+m)}(R\underset{\overset{\|}{O}}{C}CR'\underset{\overset{\|}{O}}{C}CR''R'''R'''')_m$$

wherein the metal M is selected from the group of Ti, Zr, Hf, V, Nb, Ta, Cr, Mo and W; $n$ has a value of 4 to 6; $m$ is 0 to 6 but is 0 only when $R^v$ is an alkyl radical having at least 3 fluorine atoms; $y$ is 0 to 6 but is 0 only when the valence of M is 5 or 6 while the sum of $y+m$ is not greater than $n$; X is a halogen having an atomic weight greater than 34; R and $R^v$ are each a halogen substituted alkyl radical of from 1 to 7 carbon atoms; R' and R'''' are each selected from the class consisting of R, hydrogen, halogen and alkyl radicals of from 1 to 7 carbon atoms; and R'' and R''' are each selected from the class consisting of hydrogen and halogen.

---

The compounds of the present invention are useful for the purpose of effecting separation of metals of Groups IV–B, V–B, and VI–B by gas chromatography.

The invention described herein may be manufactured and used by or for the United States Government for governmental purposes without the payment to me of any royalty thereon.

The present invention relates to novel organo-metallic chelates and to methods for preparing same. More specifically, the invention relates to metal chelates which broadly may be designated as haloalkoxymetal chelates, halodiketometal chelates, and haloalkoxydiketometal chelates, and to methods suitable for the preparation of such compounds.

The novel compounds of the invention have been found particularly valuable in the separation and purification of metals with a valence of 4 to 6 found in Groups IV–B, V–B, and VI–B of the periodic chart of the elements. The metals here of interest with their groups are: Group IV–B—Ti, Zr and Hf; Group V–B—V, Nb and Ta; and Group VI–B—Cr, Mo and W. In addition, the novel compounds are useful in the preparation of metals in the above groups in ultrapure state. Moreover, they form the basis for a simplified but effective qualitative as well as quantitative analytical method for such metals.

Another valuable application of the compounds of the invention comprises the use of such compounds for plating or coating a substrate at moderate temperatures with one or more of the metals in the groups of interest, as mentioned above.

A preferred method for plating a surface by means of the novel compounds of the invention is disclosed and claimed in U.S. application Ser. No. 362,212, filed by Ross W. Moshier on Apr. 23, 1964, now U.S. Patent No. 3,356,527.

It has long been known in the art that the separation, purification, and analyses of metals in Groups IV–B, V–B, and VI–B, particularly when they exist as complex mixtures in ores, alloys and the like, are unreliable, inefficient, and time consuming.

One such prior art method, for example, for use in the separation and purification of the metals of interest in Groups IV–B, V–B, and VI–B comprises the fractional crystallization of selected double salts of the said metals. By way of example, tantalum and niobium are separated and purified by multiple crystallizations of the metal double salt mixture comprising $K_2TaF_7$ and $K_2NbOF_5$.

Other prior art methods useful for the separation and purification of the metals in interest include (1) the formation of tannin complexes of the metals in question followed by separation of the salts from undesirable materials and from the mother liquor by multiple precipitation, and (2) electrolysis of fused salts as exemplified by mixtures of double salts, i.e., the double salts $K_2TaF_7$ and $K_2NbOF_5$ mentioned above.

As is well-known in the art, the above and related prior art methods are beset with numerous disadvantages with regards to their efficiency for separating and purifying the metals heretofore mentioned.

Because of the low volatilization characteristics of the novel compounds of the invention, the disadvantages of prior art methods are essentially eliminated by the use of the said compounds for purposes of separating and purifying the metals of interest mentioned herein.

It has been found that mixtures of metals of Groups IV–B, V–B, and VI–B of the Periodic Arrangement of Elements, having a valence of 4 to 6, may be readily separated from each other and purified, if desired, by first converting the metals to selected haloorgano-metal complexes by methods to be fully described below, separating the metal complexes by distillation, by sublimation, and/or by chromatography and the like, and reducing the separated complex to the pure metal by reaction of said complex with hydrogen.

In the form of their metal chelates, the metals of interest may be readily volatilized at moderate temperatures which differ for each metal compound, without decomposition. Thus, individual metals, in the form of metal chelates of the invention, are readily and efficiently separated, and subsequently purified, by such well-known techniques as distillation, sublimation, and chromatography because the individual metal chelates have different and distinct vapor pressure characteristics even at relatively low temperatures.

The advantage of separating such metals at low temperatures by such conventional techniques is obvious when the inadequacies of the prior art methods, as heretofore mentioned, are kept in mind.

An object of the invention is to provide novel halo-organo-metal chelates.

Another object of the invention is the provision of a method for making novel metal chelates.

Yet another object of the invention is the provision of novel metallo-organic derivatives useful in the separation, purification, and analyses of metals selected from Groups IV–B, V–B, and VI–B of the Periodic Arrangement of Elements.

Another object of the invention is the provision of novel metal chelates which are useful in preparing the metals of interest in pure form and in plating the said metals, the metals being selected from Groups IV–B, V–B and VI–B and having a valence of 4 to 6.

More specifically, a preferred aspect of the invention relates to metal chelates selected from the group consisting of
(1) a haloalkoxydiketometal compound of the general formula:

$$(R^vCH_2O)_yMX_{n-(y+m)}(R\underset{\overset{\|}{O}}{C}CR'\underset{\overset{\|}{O}}{C}CR''R'''R'''')_m$$

wherein M is a metal of Groups IV–B, V–B and VI–B of the Periodic Arrangement of Elements, $n$ is the valence state of M, $y$ and $m$ are each 1 to 6 and the sum of $y+m$ is not greater than $n$. X is a halogen having an atomic weight greater than 34, R and $R^V$ are each a halogen substituted alkyl radical of from 1 to 7 carbon atoms; R′ and R″″ are each selected from the class consisting of R, hydrogen, halogen, and alkyl radicals of 1 to 7 carbon atoms, and R″ and R‴ are each selected from the class consisting of hydrogen and halogen.

(2) a halodiketometal compound of the general formula:

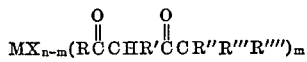

wherein $m$, $n$, M, X, R, R′, R″, R‴, and R″″ are as defined under Formula 1 above, and (3) a haloalkoxymetal compound of the general formula:

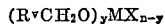

wherein $n$, $y$, M, X, and $R^V$ are as defined under Formula 1 above.

Metal halides of the Group IV-B, V-B, VI-B metals with a valence of 4 to 6 are generally available from usual commercial sources; nevertheless, should it become necessary or desirable, the following method has general applicability for the preparation of such metal halides as are useful in the synthesis of the instant novel compounds. Briefly, the halide is prepared by the reaction of a metal oxide with a carbon tetrahalide. The reaction is usually conducted in a sealed tube. The reaction temperature will vary with the different metals and also with the particle size of the metal oxide. Insofar as the metal halides described herein, the reaction temperature will normally vary from about 280° C. to 370° C.

The rate of reaction betwen the metal oxide and the halide is controlled by placing the tube in a cool furnace, increasing the temperature in a period of about an hour to a temperature within the range stated above, and maintaining the tube and its contents at the stated temperature until no solid particles of oxide remain in the tube. Within the temperature range stated above, the reaction is complete within 1 to 3 hours. If the reaction is carried out at a temperature outside the stated range, the reaction time is varied accordingly.

The novel halodiketo- and haloalkoxy-metal chelates, the compounds of Formulas 2 and 3, respectively, are prepared by contacting the metal halide with an appropriate halodiketone or haloalkanol and allowing the resulting reaction mixture to stand until formation of the chelate is completed.

As will be clear from the following specific examples, compounds of general Formulas 2 and 3, prepared by the above-described techniques, have relatively low boiling points at low pressures. Consequently, they may be easily separated from and obtained in a substantially pure state by distillation from the reaction mass.

The methods above described for preparing compounds having general Formula 1 all comprise reacting or contacting the reaction product of two of the reactants with the third reactant. Useful variants over the above described embodiments for preparing compounds of Formula 1 comprise contacting, for example, a halodiketometal complex of general Formula 2 with an alcohol, or conversely, contacting a haloalkoxy metal complex of general Formula 3 with a diketone.

SPECIFIC EXAMPLES (1) Haloalkoxydiketometal:
 (a) $MX_n$
 (b) halodiketone
 (c) haloalkyl alcohol Prepared by reaction of (a), (b) and (c), in any order or as a mixture of all three.

(2) Halodiketometal:
 (a) $MX_n$
 (b) halodiketo (3) Haloalkoxymetal:
 (a) MX
 (b) haloalcohol Illustrative examples may be charted broadly as:

EXAMPLES CHART

| Example | Halo | Diketo | Metal compounds |
|---|---|---|---|
| 1 | F | Heptanediono | Ti IV |
| 2 | F | Pentanediono | Nb V |
| 3 | F | do | Ta V |
| 4 | F | do | Ta V |
| 5 | F | do | Nb V |
| 6 | F | Heptanediono | Nb V |
| 7 | F | do | W VI |
| 8 | F | Pentanediono | Nb |

| Example | Halo | Alkoxy | Metal compounds |
|---|---|---|---|
| 9 | F | Propoxy | Ti IV |
| 10 | F | do | Ta V |
| 11 | F | do | Nb |
| 12 | F | Ethoxy | Nb V |

| Example | Halo | Alkoxy | Diketo | Metal compounds |
|---|---|---|---|---|
| 13 | F | Propoxy | | Ti IV |
|  | F |  | Heptanediono |  |
| 14 | F | Propoxy | | Nb V |
|  | F |  | Heptanediono |  |
| 15 | F | Ethoxy | | Ta V |
|  | F |  | Pentanediono |  |
| 16 | F | Ethoxy | | W VI |
|  | F |  | Pentanediono |  |
| 17 | F | Propoxy | | Ta V |
|  | F |  | Pentanediono |  |
| 18 | F | Ethoxy | do | Nb |
| 19 | F |  | do | Nb V |

The following examples will serve to illustrate the above general procedures and variants thereof as well as the application of the novel metal chelates of this invention. It should be understood that these examples are exemplary in nature and are not deemed to limit the invention in any manner.

Example 1.—Bis(1,1,2,2,3,3,7,7,7-decafluoro - 4,6-heptanediono) titanium (IV) chloride. A quantity, 0.349 g., of titanium tetrachloride was cooled to about −80° C. and contacted with a 1.0 ml. quantity of anhydrous 1,1,1,2,2,3,3,7,7,7-decafluoro-4,6-heptanedione. The mixture upon being allowed to warm to room temperature underwent reaction with evolution of hydrogen chloride and formation of a clear solution of the subject compound in the excess of diketone. The excess of diketone reagent was removed by distillation under partial vacuum at ambient temperature. The metal chelate remaining as a liquid, distilled 42 to 52° C./0.05 mm. Yield 65.2 percent of purified product.

Calculated: Ti, 6.53%; C, 22.94%; H, 0.275%; F, 51.85%; Cl, 9.67%. Found: Ti, 6.90%; C, 23.71%; H, 0.70%; F, 53.67%; Cl, 8.18%.

Example 2.—Bis(1,1,1,5,5,5-hexafluoro - 2,4 - pentanediono)niobium (V) chloride. A quantity, 0.797 g., of niobium pentachloride was cooled to about −80° C. and contacted with a 1.2 ml. quantity of 1,1,1,5,5,5-hexafluoro-2,4-pentanedione. The product was prepared and purified by the same procedure as described in Example 1, the distillation temperature being 45° C./0.05 mm. The purified product was a light yellow oil. Analysis of the product:

Calculated: F, 37.9%; C, 15.0%; H, 0.33%. Found: F, 35.2%; C, 17.9%; H, 0.48%.

Example 3.—Bis(1,1,1,5,5,5 - hexafluoro - 2,4-pentanediono)tantalum (V) trichloride. A quantity, 0.211 g., of tantalum pentachloride was contacted with a 1.2 ml. quantity of 1,1,1,5,5,5-hexafluoro-2,4-pentanedione and the chelate prepared and purified by the same procedure as described in Example 1, the distillation temperature being 45° C./0.05 mm. The purified product was a light yellow oil. Analysis of the product:

Calculated: C, 20.63%; H, 0.35%; F, 39.1%; Cl, 8.12%; Ta, 20.73%. Found: C, 19.61%; H, 0.73%; F, 35.4%; Cl, 9.99%; Ta, 21.58%.

Example 4.—Tris(1,1,1,5,5,5-hexafluoro - 2,4 - pentanediono)tantalum (V) chloride. A quantity of tantalum pentachloride, equivalent to 0.1737 g. of tantalum pentoxide, was contacted with 1.5 ml. of 1,1,1,5,5,5-hexafluoro-2,4-pentanedione at room temperature. Evolution of by-product hydrogen chloride was noted. After cessation of the rapid reaction and hydrogen chloride evolution, the reaction mixture was heated at refluxing temperature and held at this temperature for 3½ hours. The product was obtained as a red semisolid at 25° C. B.P. 130° C./3 mm. and analyzed as follows:

Calculated: Ta, 21.94%; C, 21.84%; H, 0.36%; F, 41.46%; Cl, 8.59%. Found: Ta, 23.07%; C, 23.05%; H, 0.34%; F, 43.26%; Cl, 4.78%.

Example 5.—Tris(1,1,1,5,5,5-hexafluoro-2,4 - pentanediono niobium (V) dichloride. A quantity of niobium pentachloride, equivalent to 0.2116 g. of niobium pentoxide, was contacted with 1.0 ml. of 1,1,1,5,5,5-hexafluoro-2,4-pentanedione at room temperature. Evolution of by-product hydrogen chloride was noted. After cessation of the hydrogen choride evolution the reaction mixture was heated at refluxing temperature for 2½ hours. The product was obtained as a red oil distilling at 63 to 87° C./3.0 mm. Analysis calculated for $NbCl_2(CF_3COCHCOCF_3)_3$:

Calculated: Nb, 11.83%; C, 22.9%; H, 0.4%; F, 43.6%; Cl, 9.1%. Found: Nb, 14.2%; C, 21.4%; H, 0.6%; F, 44.0%; Cl, 11.2%.

Example 6.—1,1,1,2,2,3,3,7,7,7-decafluoro-4,6-heptanediononiobium (V) tetrachloride. A quantity of niobium pentachloride equivalent to 0.197 g. of niobium pentoxide, was contacted with 0.9 ml. of 1,1,1,2,2,3,3,7,7,7-decafluoro-4,6-heptanedione at about −80° C. and allowed to warm to room temperature, under anhydrous conditions, whence reaction occurred. Evolution of by-product hydrogen chloride was noted. The compound was obtained as a yellowish liquid B.P. 50–52° C./0.005 mm. which analyzed as follows:

Calculated: C, 15.52%; H, 0.186%; F, 35.07%; Cl, 26.17%; Nb, 17.15%. Found: C, 15.23%; H, 0.27%; F, 35.39%; Cl, 25.85%; Nb, 16.74%.

Example 7.—Bis(1,1,1,2,2,3,3,7,7,7 - decafluoro - 4,6-heptanediono) tungsten (VI) chloride. A quantity of tungsten hexachloride, equivalent to 0.185 g. of tungsten oxide, was contacted with 0.8 ml. of 1,1,1,2,2,3,3,7,7,7-decafluoro-4,6-heptanedione at −80° C. and allowed to warm to room temperature when reaction occurred. Hydrogen chloride evolution was noted. The product was obtained as a liquid by distillation B.P. 45° C./0.01 mm. which analyzed as follows:

Calculated: C, 18.0%; H, 0.21%; F, 40.44%; Cl, 15.09%. Found: C, 15.52%; H, 0.31%; F, 39.47%; Cl, 14.31%.

Example 8.—Preparation of bis(1,1,1,5,5,5-hexafluoro-2,4-pentanedionato)niobium tribromide. To a quantity of niobium pentabromide was added carbon tetrachloride as solvent, and an excess of 1,1,1,5,5,5-hexafluoro-2,4-pentanedione. The mixture was heated at 50° C. for a short time, and then allowed to cool to ambient temperature. The carbon tetrachloride and excess hexafluoroacetylacetone were removed by slow evaporation. The reddish crystalline solid product assayed as $NbBr_3F_{12}C_{10}H_2O_4$ which is bis(1,1,1,5,5,5-hexafluoro-2,4-pentanedionato) niobium tribromide M.P. 94–96.

Example 9.—Bis 1,1,1,2,2 - pentafluoropropoxytitanium (IV) chloride. A quantity of titanium tetrachloride equivalent to 0.155 g. of titanium dioxide was contacted with 0.5 ml. of 1,1,1,2,2-pentafluoropropanol at below 25° C. and allowed to warm up to room temperature. Evolution of by-product hydrogen choride was noted. A white crystalline product was obtained which sublimed at 50–70° C./0.04 mm. M.P. 82–85° C. with decomposition. It analyzed as follows:

Calculated: Ti, 11.48%; C, 17.28%; H, 0.96%; Cl, 17.01%; F, 45.58%. Found: Ti, 11.89%; C, 14.47%; H, 1.02%, Cl, 14.63%; F, 47.81%.

Example 10.—Tris-1,1,1,2,2-pentafluoropropoxytantalum (V) chloride. A quantity of tantalum pentachloride, equivalent to 0.136 g. of tantalum pentoxide under anhydrous conditions was contacted with 1.0 ml. of 1,1,1,2,2-pentafluoropropanol at −80° C. Upon allowing the mixture to warm to room temperature reaction occurred. Evolution of hydrogen chloride was noted. The compound was obtained as a light-yellow liquid B.P. 88–90° C./ 0.2 mm. which analyzed as follows:

Calculated: Ta, 25.89%; Cl, 10.14%; F, 40.77%; C, 15.47%; H, 0.86%. Found: Ta, 30.6%; Cl, 10.67%; F, 33.89%; C, 16.16%; H, 1.36%.

Example 11.—Tris - 2,2,3,3,3-pentafluoropropoxyniobium dichloride. To a quantity of niobium pentachloride equivalent to 0.1035 g. niobium pentoxide was added an excess of pentafluoropropanol. Evolution of hydrogen chloride gas was noted. The excess alcohol was distilled off at reduced pressure. A crystalline product was obtained.

Example 12.—Tris-2,2,2 - trifluoroethoxyniobium (V) chloride. To a quantity of niobium pentachloride equivalent to 0.1318 g. niobium pentoxide was added an excess of 2,2,2-trifluoroethanol. Evolution of hydrogen chloride gas was noted. The excess of alcohol was distilled off under reduced pressure. The product remaining distilled at 68° C./0.001 mm. The distilled product was successfully gas chromatographed.

Example 13.—Bis(1,1,1,2,2-pentafluoropropoxy) bis(1, 1,1,2,2,3,3,7,7,7 - decarfluoro - 4,6-heptanediono)titanium (IV). A quantity of titanium tetrachloride, equivalent to 0.0757 g. of titanium dioxide, was contacted with 1 ml. of 1,1,1,2,2,3,3,-7,7,7-decafluoro - 4,6 - heptanedione at room temperature. The resulting reaction mixture was next contacted with 1 ml. of 1,1,1,2,2-pentafluoropropyl alcohol at room temperature. Evolution of by-product hydrogen chloride was noted. The product was obtained as a pale yellow liquid, B.P. 43° C./0.05 mm., and analyzing as follows:

Calculated: C, 25.03%; H, 0.63%; F, 59.3%; Ti, 4.9%. Found: C, 25.36%; H, 0.71%; F, 57.9%; Ti, 4.5%.

Example 14.—Tris(1,1,1,2,2-pentafluoropropoxy) (1,1, 1,2,2,3,3,7,7,7 - decafluoro - 4,6 - heptanediono)niobium (V) chloride. A quantity of niobium pentachloride, equivalent to 0.2312 g. of niobium pentoxide, was contacted with 1 ml. of 1,1,1,2,2,3,3,7,7,7-decafluoro-4,6-heptanedione at room temperature. The resultant reaction products mixture was next contacted with 1 ml. of 1,1,1, 2,2-pentafluoropropyl alcohol at room temperature. Hydrogen chloride evolution occurred. The product was obtained as a pale yellow liquid B.P. 80° C./0.05 mm. It is soluble in carbon tetrachloride and benzene. It analyzed as follows:

Calculated: C, 21.77%; H, 0.799%; F, 53.8%; Nb, 10.52%. Found: C, 21.02%; H, 0.65%; F, 50.2%; Nb, 11.24%.

Example 15.—Bis(1,1,1 - trifluoroethoxy)1,1,1,5,5,5-hexafluoro-2,4-pentanediono)tantalum (V) chloride. A quantity of tantalum pentachloride, equivalent to 0.1862 g. of tantalum pentoxide, was contacted with 1 ml. of 1,1,1,5,5,5-hexafluoro-2,4-pentanedione at room temperature. The resultant reaction products mixture was next contacted with 1 ml. of 1,1,1-trifluoroethanol at room temperature. Mixing of the reactants resulted by hydrogen chloride evolution. The product was obtained as a pale yellow liquid B.P. 46° C./0.05 mm. It is soluble in carbon tetrachloride and benzene. It analyzed as follows:

Calculated: Ta, 27.55%; C, 16.47%; H, 0.76%; F, 35.1%. Found: Ta, 27.88%; C, 16.66%; H, 0.84%; F, 39.4%.

Example 16.—Bis(1,1,1-trifluoroethoxy) tris(1,1,1,5,5, 5-hexafluoro - 2,4 - pentanediono)tungsten(VI) chloride. A quantity of tungsten hexachloride, equivalent to 0.2144 g. of tungsten oxide, was contacted with 1.2 ml. of 1,1,1, 5,5,5 - hexafluoro - 2,4 - pentanedione at room temperature. The resultant reaction products mixture was next contacted with 1 ml. of 1,1,1-trifluoroethanol at room temperature. Mixing of the reactants resulted by hydrogen chloride evolution. The product was a light yellow liquid, B.P. 40–47° C./0.05 mm. It is soluble in carbon tetrachloride and benzene. It analyzed:

Calculated: C, 21.97%; H, 0.68%; F, 43.9%; Cl, 3.41%; W, 17.7%. Found: C, 20.82%; H, 1.7%; F, 41.5%; Cl, 3.3%; W, 16.7%.

Example 17.—Tris(1,1,1,2,2 - pentafluoropropoxy) - 1, 1,1,5,5,5 - hexafluoro - 2,4 - pentanediono-tantalum(V) chloride.

(a) A quantity of tantalum pentachloride, equivalent to 0.144 g. of tantalum pentoxide, was contacted with 0.9 ml. of 1,1,1,2,2-pentafluoropropanol at room temperature. Evolution of by-product hydrogen chloride was noted. The resulting reaction mixture was next contacted with 1.0 ml. of 1,1,1,5,5,5-hexafluoro-2,4-pentanedione at room temperature. The product was obtained as a colorless liquid B.P. 96–114° C./0.2 mm. It analyzed as follows:

Calculated: Ta, 20.8%; C, 19.32%; H, 0.81%; F, 45.88%; Cl, 4.07%. Found: Ta, 23.9%; C, 20.6%; H, 1.07%; F, 45.73%; Cl, 4.6%.

(b) As in (a) by contacting the tantalum pentachloride first with 1,1,1,5,5,5-hexafluoro-2,4-pentanedione at room temperature and then by contacting the resulting reaction mixture with 1,1,1,2,2,-pentafluoropropanol. The product was obtained as a colorless liquid B.P. 96–114° C./0.2 mm. It analyzed as follows:

Found: Ta, 25.3%; C, 19.93%; H, 0.88%; F, 45.64%; Cl, 3.47%.

(c) As in (a) and (b) by contacting the tantalum pentachloride with a mixture consisting of 1.0 ml. 1,1,1,2,2-pentachloropropanol and 1.0 ml. of 1,1,1,5,5,5-hexachloro-2,4-pentanedione. The product was obtained as a colorless liquid B.P. 96–114° C./0.2 mm. It analyzed as follows:

Found: Ta, 22.9%; C, 20.01%; H, 0.66%; F, 43.76%; Cl, 4.30%.

Example 18.—Bis(ethoxy)(1,1,1,5,5,5 - hexafluoro - 2, 4-pentanediono) niobium dibromide. To 0.4 g. of bis(1,1, 1,5,5,5 - hexafluoro - 2,4 - pentanediononiobium tribromide was added 25 ml. of ethanol. A color change was noted. The excess ethanol and the released hexafluoroacetylacetone were distilled off by gentle heating under reduced pressure. The product was orange colored, and liquid at ambient temperature.

Example 19.—Preparation and gas chromatography of 1,1,1,5,5,5 - hexafluoro - 2,4 - pentanediono niobium(V) tetrachloride.

Equations for (1) haloalkoxydiketo metal compounds

R(a)

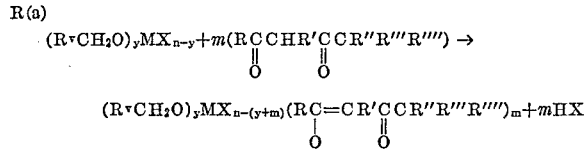

R(b)

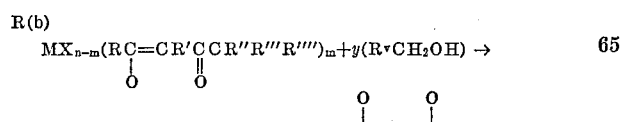

R(c)

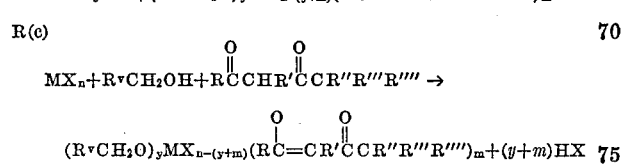

Examples of products obtained

Example 20.—Bis(fluoromethoxy)5,5,5 - trifluoro - 2,4-pentanediono niobium(V) chloride.

Example 21.—Bis(trichloroethoxy)5,5,6,6,6 - pentafluoro-2,4-hexanediono tantalum(V) bromide.

Example 22.—Tris(3 - bromopropoxy)bis - 5,5 - dibromo - 2,4 - pentanediono tungsten(VI) chloride.

Example 23.—(3,3,3 - trifluoropropoxy)3 - iodo - 2,4-pentanediono titanium(IV) chloride.

Example 24.—(2,2 - diiodoethoxy)1,1,1,5,5,5-hexafluoro-2,4-pentanediono hafnium(IV) bromide.

Example 25.—(2 - bromoethoxy)5,5,5 - trichloro - 2,4-pentanediono zirconium(IV) iodide.

Example 26.—Bis (2 - chloro - 2 - bromoethoxy)3,5,5, 5-tetrafluoro-2,4-pentanediono hafnium(IV) iodide.

Example 27.—(1 - iodo - 2 - chloro - 3 - bromobutoxy) bis - 1,1 - diiodo - 3 - bromo - 6,6 - dichloro-2,4-hexanedionohafnium(IV) chloride.

Example 28.—Bis(4,4 - difluoropentoxy)bis(1,1,1,7,7, 7 - hexachloro - 3,5 - heptanediono)titanium(IV).

Example 29.—Bis(trifluoroethoxy)5,5,5 - trifluoro - 2, 4-pentanediono niobium chloride.

Example 30.—Bis(pentafluoropropoxy)1,1,1,6,6,6-hexachloro-3,5-hexanediono tantalum iodide.

Equation of (2) halodiketo metal compounds

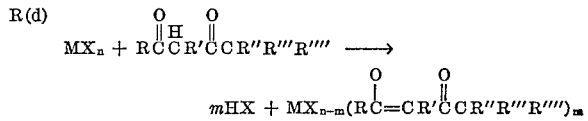

Examples of diketometal chelate products

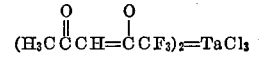

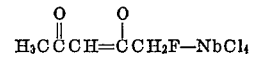

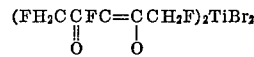

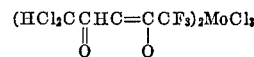

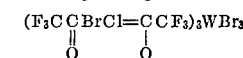

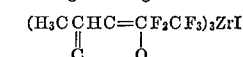

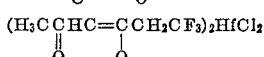

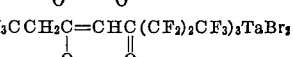

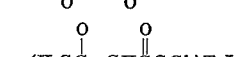

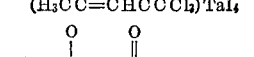

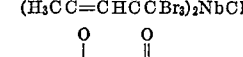

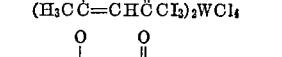

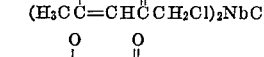

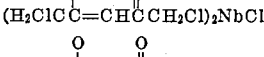

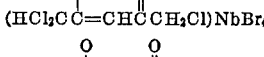

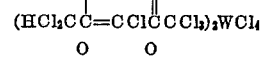

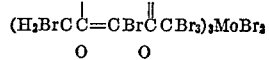

$$(H_2IC\underset{O}{\overset{|}{C}}=CH\overset{O}{\overset{\|}{C}}Cl_3)MoCl_4$$

$$(HI_2C\underset{O}{\overset{|}{C}}=CI\overset{O}{\overset{\|}{C}}CH_3)_2ZrCl_2$$

$$(CCl_3CH_2\underset{O}{\overset{|}{C}}=CH\overset{O}{\overset{\|}{C}}CCl_3)_3HfCl$$

$$(F_3CCF_2C\underset{O}{\overset{|}{=}}CFC\overset{O}{\overset{\|}{(CF_2)_3}}CF_3)_3NbI_2$$

$$(CH_3\underset{O}{\overset{|}{C}}=CFC\overset{O}{\overset{\|}{}}CH_3)_3HfBr$$

$$(CCl_3(CCl_2)_4\underset{O}{\overset{|}{C}}=CH\overset{O}{\overset{\|}{C}}(CCl_2)_5CCl_3)_2NbCl_3$$

$$CBr_3(CBr_2)_3\underset{O}{\overset{|}{C}}=CH\overset{O}{\overset{\|}{C}}(CBr_2)_2CBr_3NbCl_4$$

$$(CH_3(ClH)\underset{O}{\overset{|}{C}}=CH\overset{O}{\overset{\|}{C}}(ClH)Cl_3)_2TaBr_3$$

$$CF_3(CF_2)_6\underset{O}{\overset{|}{C}}=CH\overset{O}{\overset{\|}{C}}(CF_2)_6CF_3NbCl_4$$

Equation for (3) haloalkoxy metal compounds $$\text{R}(e)$$
$$MX_n + yRCH_2OH \longrightarrow MX_{n-y}(OCH_2R)_y + yHX$$

Additional examples of products of haloalkoxy metal compounds are:

Trisbromomethoxy niobium(V) chloride
Bis-2,2,2-trifluoroethoxytitanium(IV) bromide
Pentakis(iodoethoxy)tantalum(V)
Tris(2,2,2-trichloro-1,1-difluoropropoxy) molybdenum(V) chloride
Tris(1,1,1,2,2,3,3-heptafluorobutoxy)tungsten(VI) bromide
Tris(1,1,1,2,2,3,3,4,4,5,5,6,6-tridecabromoheptoxy) tungsten(VI) chloride
Tetrakis(dichloroethoxy)vanadium(IV)
Bis(diiodopropoxy)niobium(V) bromide
Tetrakis(fluorobutoxy)zirconium(IV)
Hexakis(dichloropentoxy)tungsten(VI)
Bis(chlorofluorohexoxy)niobium(V) iodide
Tris(chlorofluoroiodopentoxy)niobium(V) bromide
Tris(bromochloropropoxy)tantalum(V) chloride, and
Bis(dibromoiodopropoxy)hafnium(IV) chloride.

As shown above, the compounds of the invention are especially valuable in the separation and purification of stated metals of Groups IV–B, V–B, and VI–B. The halo-metal chelates of the invention also form the basis for an analytical procedure for analyzing a mixture of such metals. For example, the metals in a sample comprising iron, tungsten, titanium, aluminum and tantalum are quickly and easily separated and quantitatively estimated by subjecting the halochelates of the said metals to gas chromatography. In this technique, the various metal chelates have different affinities for an adsorbent which is used to contact the metal chelate in vapor form, the difference in affinity resulting in the accumulation of individual chelates in separate zones in a column of such adsorbent.

The processes, the products and the associations that are presented hereby are submitted as being experimentally confirmed reductions to practice of the present invention and modifications may be made therein without departing from the spirit and the scope of the invention.

I claim:
1. A haloalkoxydiketo metal compound of the general formula

$$(R^vCH_2O)_yMX_{n-(y+m)}(R\underset{O}{\overset{|}{C}}R'\overset{O}{\overset{\|}{C}}R''R'''R'''')_m$$

wherein the metal M is selected from the group of Ti, Zr, Hf, V, Nb, Ta, Cr, Mo and W; $n$ has a value of 4 to 6; $m$ is 0 to 6 but is only 0 when $R^v$ is an alkyl radical having at least 3 fluorine atoms; $y$ is 0 to 6 but is 0 only when the valence of M is 5 or 6 while the sum of $y+m$ is not greater than $n$; X is a halogen having an atomic weight greater than 34; R and $R^v$ are each a halogen substituted alkyl radical of from 1 to 7 carbon atoms; R' and R'''' are each selected from the class consisting of R, hydrogen, halogen and alkyl radicals of from 1 to 7 carbon atoms; and R'' and R''' are each selected from the class consisting of hydrogen and halogen.

2. A halodiketo metal compound of the general formula $$MX_{5-m}(R\underset{O}{\overset{|}{C}}R'\overset{O}{\overset{\|}{C}}R''R'''R'''')_m$$

wherein $m$ has a value of 1 to 4 and the remaining symbols are as identified in claim 1.

3. A halodiketo metal compound of the general formula $$MX_{6-m}(R\underset{O}{\overset{|}{C}}R'\overset{O}{\overset{\|}{C}}R''R'''R'''')_m$$

wherein $m$ has a value of 1 to 5 and the remaining symbols are as identified in claim 1.

4. A fluoroalkoxy metal compound of the formula $$(R^vCH_2O)_yMX_{m-y}$$

wherein $m$ has a value of 4 to 6, $y$ has a value of 1 to 5 but $m-y$ is never 0 or a negative number, M is selected from the group of Ti, Zr, Hf, V, Nb, Ta, Cr, Mo and W; X is a halogen having an atomic weight greater than 34, and $R^v$ is a fluoro-substituted alkyl radical containing at least 3 fluorine atoms and from 1 to 7 carbon atoms.

5. The compound bis(1,1,1,2,2,3,3,7,7,7 - decafluoro-4,6-heptanediono)titanium(IV) chloride.

6. The compound tris(1,1,1,5,5,5-hexafluoro-2,4-pentanediono)niobium(V) dichloride.

7. The compound bis(1,1,1,2,2-pentafluoropropoxy) titanium(IV) chloride.

8. The compound tris-2,2,2,-trifluoroethoxy niobium (V) chloride.

9. The compound bis(1,1,1,2,2-pentafluoropropoxy) bis(1,1,1,2,2,3,3,7,7,7-decafluoro - 4,6-heptanediono)titanium(IV).

10. The compound bis(1,1,1-trifluoroethoxy)-1,1,1,5,5,5-hexafluoro-2,4-pentanediono-tantalum(V) chloride.

11. The compound tris(1,1,1,2,2-pentafluoropropoxy)-1,1,1,5,5,5 - hexafluoro - 2,4 - pentanediono-tantalum(V) chloride.

12. The compound (2,2,-diiodoethoxy)1,1,1,5,5,5-hexafluoro-2,4-pentanediono hafnium(IV) bromide.

13. The compound (1-iodo-2-chloro-3-bromobutoxy) bis-1,1-diiodo - 3 - bromo - 6,6 - dichloro-2,4-hexanediono hafnium(IV) chloride.

14. The compound bis(ethoxy)(1,1,1,5,5,5-hexafluoro-2,4-pentanediono)niobium dibromide.

References Cited

UNITED STATES PATENTS 2,160,273   5/1939   Loane et al. _____ 87—9

OTHER REFERENCES

Funk et al.: Ber., 62 (1929), pp. 1688–90.
Funk: Ber., 67 (1934), pp. 1801–4.
Christ et al.: Angew. Chem. (Int. Ed.), 2 (1963), p. 97.
Djordjevic et al.: J. Inorg. Nucl. Chem., 25 (1963), pp. 1099–1109.

(Other references on following page)

Morris et al.: Inorg. Chem., 2 (1963), pp. 411–2.
Sievers et al.: Inorg. Chem., 2 (1963), pp. 693–4.
Dryden et al.: J. Phys. Chem., 62 (1958), pp. 635–7.
Pande et al.: Chem. and Ind. (London), 1958, pp. 1198–9.
Jones et al.: J. Am. Chem. Soc., 78 (1956), pp. 4289–90.

HELEN M. McCARTHY, *Primary Examiner.*
A. P. DEMERS, *Assistant Examiner.*

U.S. Cl. X. R.

117—107.2; 210—31; 260—429.3, 429.5, 438.5